US011037299B2

United States Patent
Song et al.

(10) Patent No.: US 11,037,299 B2
(45) Date of Patent: Jun. 15, 2021

(54) REGION MERGING IMAGE SEGMENTATION ALGORITHM BASED ON BOUNDARY EXTRACTION

(71) Applicant: CHINA INSTITUTE OF WATER RESOURCES AND HYDROPOWER RESEARCH, Beijing (CN)

(72) Inventors: Wenlong Song, Beijing (CN); Rui Tang, Beijing (CN); Juan Lv, Beijing (CN); Jingxuan Lu, Beijing (CN); Kun Yang, Beijing (CN); Zhicheng Su, Beijing (CN); Yuanyuan Duan, Beijing (CN); Xuejun Zhang, Beijing (CN); Lihua Zhao, Beijing (CN); Yizhu Lu, Beijing (CN); Hongjie Liu, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 0 days.

(21) Appl. No.: 17/086,153

(22) Filed: Oct. 30, 2020

(65) Prior Publication Data
US 2021/0065376 A1    Mar. 4, 2021

Related U.S. Application Data

(63) Continuation of application No. PCT/CN2019/075051, filed on Feb. 14, 2019.

(51) Int. Cl.
G06T 7/11    (2017.01)
G06T 7/12    (2017.01)
G06T 7/187    (2017.01)
G06T 7/40    (2017.01)

(52) U.S. Cl.
CPC ............... *G06T 7/187* (2017.01); *G06T 7/11* (2017.01); *G06T 7/12* (2017.01); *G06T 7/40* (2013.01)

(58) Field of Classification Search
CPC ... G06T 7/11; G06T 7/12; G06T 7/187; G06T 7/40
See application file for complete search history.

(56) References Cited

U.S. PATENT DOCUMENTS

2003/0144585 A1*  7/2003  Kaufman ............. A61B 5/0059 600/407
2011/0075927 A1   3/2011  Xu
2012/0275701 A1*  11/2012  Park ..................... G06T 7/162 382/173
2014/0314312 A1*  10/2014  Hashiguchi ........... G06T 7/162 382/164
2015/0332117 A1*  11/2015  Zhou ....................... G06K 9/52 382/201
2016/0042250 A1*  2/2016  Cordova-Diba ... G06K 9/00671 382/180

FOREIGN PATENT DOCUMENTS

CN    101106716 A    1/2008
CN    107945183 A    4/2018
CN    109102513 A    12/2018

OTHER PUBLICATIONS

Nielsen et al. ("On Region Merging: The Statistical Soundness of Fast Sorting with Applications," IEEE Conference on Computer Vision and Pattern Recognition, Jun. 18-20, 2003) (Year: 2003).*
Falah et al. ("A region-region and region-edge cooperative approach of image segmentation," Proceedings of 1st International Conference on Image Processing, Nov. 13-16, 1994) (Year: 1994).*
Hernandez et al. ("Joint region merging criteria for watershed-based image segmentation," International Conference on Image Processing, Sep. 10-13, 2000) (Year: 2000).*
D1: "SAR Image Segmentation Algorithm Using Hierarchical Region Merging with Edge Penalty", Journal of Electronics & Information Technology, vol. 37, No. 2, pp. 262-265, Feb. 2015.

* cited by examiner

*Primary Examiner* — Yubin Hung
(74) *Attorney, Agent, or Firm* — J.C. Patents

(57) ABSTRACT

A Region Merging image segmentation algorithm based on boundary extraction is disclosed, comprising the steps of calculating a gradient image, extracting a boundary and carrying out initial segmentation and Region Merging, wherein each pixel is regarded as one region when initial segmentation is not conducted. In the Region Merging process, the portion of the common boundary of two adjacent regions that lies on the boundary image is taken as the merging cost, the regions are merged according to the ascending order of the mean gradient value inside the region, and a texture difference evaluation mechanism is introduced to reduce the wrong segmentation. The algorithm solves the problems of the other current segmentation algorithms, such as over-segmentation, easy to be influenced by noise and illumination, large in computation and memory consumption, in need of a large number of samples being marked manually and the like. Besides, all regions or all categories achieve the best segmentation result on one final segmentation result. These advantageous features can reduce the computational resource consumption of subsequent tasks and improve their results.

2 Claims, No Drawings

REGION MERGING IMAGE SEGMENTATION ALGORITHM BASED ON BOUNDARY EXTRACTION

CROSS-REFERENCE TO RELATED APPLICATION

This application is a continuation of PCT/CN2019/075051 filed on Feb. 14, 2019, the content of which is herein incorporated by reference in its entirety and made a part of this specification.

TECHNICAL FIELD

The invention relates to an image segmentation algorithm in computer vision, belonging to one of Region Merging image segmentation algorithms. The algorithm supports the segmentation of digital images, optical satellite images, SAR images, various medical images and the like.

BACKGROUND ART

The accurately segmented image has great value and is beneficial to improving the accuracy of algorithms such as image mosaic, three-dimensional reconstruction, target recognition, image classification and the like. At present, commonly used image segmentation algorithms include Region Merging, Clustering, Watershed, Active Contour Model (ACM), LevelSet, Region Growing, GraphCut or GrabCut, and Full Convolutional Neural Network (FCNN).

The granularity of the segmentation result of the Watershed segmentation algorithm is too fine, which is greatly affected by noise. All Clustering algorithms are seriously affected by methods for measuring pixel differences, and some Clustering algorithms have huge memory and computing power consuming. The best use of ACM, LevelSet and GraphCut is to interactively extract a single foreground object on an image. The FCNN needs a large number of samples to be marked manually, takes days to months for training in addition, and cannot be used for unmarked categories.

Due to the lack of good texture descriptors, the current Region Merging image segmentation mainly relies on the statistical differences of pixel values and shape feature for merging. Due to uneven illumination, shadows, noise and other reasons, many error segmentations are caused and segmentation results are unstable.

In addition, each region on an image has strong locality characteristics, and obviously the best effect cannot be obtained when all regions are segmented by using the same standard. Therefore, many algorithms use multiple criteria to obtain hierarchical segmentation results, and different categories or different regions on the image achieve the best segmentation effect at different levels. This defect can lead to the inconvenience of using segmentation results because some method is needed to select levels or to synthesize the results of each level.

SUMMARY OF THE INVENTION

In order to solve the problems in the background of the invention, the invention provides a Region Merging image segmentation algorithm based on boundary extraction, which takes as merging cost the ratio of the length of boundary extraction result lies on the common boundary between adjacent regions to the length of the common boundary and merges the region in ascending order of mean gradient value in the region. The initial regions merged by the algorithm can come from the result of other segmentation algorithms or each pixel can be taken as one region.

Beneficial effects: the invention avoids various problems of the above-mentioned segmentation algorithms, such as over-segmentation, easy to be influenced by noise and illumination change, large in computation and memory consumption, in need of a large number of samples being marked manually and the like. In particular, compared with the Region Merging image segmentation algorithm which depends on the statistical difference of the pixel values and the shape feature, the algorithm disclosed by the invention does not rely on shape feature and keeps objects' natural boundary from the boundary extraction result, so that the segmentation result not being vulnerable to slight pixel value change caused by illumination change and others.

In addition, the "hysteresis" of the boundary extraction algorithm and the Region Merging order of the algorithm are equivalent to adopting different segmentation standards in different regions or for different categories of the image, such that all regions or all categories of the image achieve the best segmentation effect on one final segmentation result.

DETAILED DESCRIPTION OF THE INVENTION

The technical scheme of the invention is as follows.

Firstly, a gradient image (difference map) of an image to be segmented is calculated, and algorithms for calculating the gradient image include, but are not limited to, sobel, scharr, prewitt, Roberts, laplace, de-texture.

Secondly, obtaining a boundary image consisting of boundaries extracted from the image to be segmented, wherein the boundary extraction algorithm comprises but is not limited to Canny, Deriche, Marr Hildreth.

Thirdly, the image to be segmented is initially segmented, and segmentation algorithms include, but are not limited to, Watershed, Clustering, Region Growing. This step may also be omitted, and each pixel may be regarded as one region when initial segmentation is not conducted, and the region hereinafter may also refer to a pixel.

Fourthly, establishing adjacent topological relations of the regions and merging the regions. The Region Merging mechanism is the key of the algorithm, which takes as merging cost the ratio of the length of boundary extraction result lies on the adjacent edge between adjacent regions to the length of the adjacent edge. And regions are merged in ascending order of mean gradient value in the region. This is particularly described below.

The calculated gradient image is denoted as $I_g$, and the merging order of the region $R_i$ is given by:

$$MO(R_i) = \text{avg}\{I_g(p) | p \in I_g \cap R_i\}$$

Where $I_g(p)$ represents the gradient value at p on the gradient image $I_g$, and $MO(R_i)$ means the average gradient value inside the region. Sorting all regions by ascending order according to $MO(R_i)$ during merging, and iterating over the sorted regions; for an adjacent region $R_j$ of region $R_i$, if $MO(R_j) \leq MO(R_i)$, then $R_i$ can be merged to $R_j$ according to the merging cost rule.

Let the boundary image be denoted $I_e$ and the common boundary between regions $R_i$ and $R_j$ be denoted $E_{ij}$, then the merging cost $C_{ij}$ of $R_i$ and $R_j$ is:

$$C_{ij} = \frac{Len(E_{ij} \cap I_e)}{Len(E_{ij})}$$

where Len(*) is a function that measures the length, and $C_{ij}$ means the portion of the common boundary of regions $R_i$ and $R_j$ that lies on $I_e$ (the boundary image), which is the ratio of the length of the part of $E_{ij}$ that lies on $I_e$ to the length of $E_{ij}$.

Giving a threshold value $T_c$ of the merging cost $C_{ij}$, and when $C_{ij} > T_c$, the regions $R_i$ and $R_j$ can not be merged; when $C_{ij} \leq T_c$, a priority rule needs to be adopted because there can be more than one adjacent region of the region $R_i$. For a certain adjacent region $R_j$ of $R_i$, it merges with $R_i$ in ascending order of $MO(R_j)$, i.e. the lower the $MO(R_j)$ value, the higher the priority.

After the regions are merged, common boundaries grow while boundary extraction results do not change; therefore, new regions that can be merged may be created after the merging. Therefore, the complete steps of the Region Merging mechanism are:
1. sort all regions according to $MO(R_i)$ by ascending order;
2. iterate over the sorted regions;
2.1. iterate over the adjacent region of the current region $R_i$;
2.1.1 for a certain adjacent region $R_j$ of the region $R_i$, if $MO(R_j) \leq MO(R_i)$ and $C_{ij} \leq T_c$, remember the $R_j$ that has smallest $MO(R_j)$;
2.2 if there exists the adjacent region $R_j$ that has smallest $MO(R_j)$, removing the boundary between $R_i$ and the adjacent region $R_j$, add the merged region and delete the two regions that have been merged;
3. if there being boundaries been removed, back to step 1;
4. if there being no boundary been removed, stop.

Because the boundary extraction algorithm has various defects at present, the extracted boundary have breakings, so that a certain degree of wrong segmentation still exists by only adopting the above logic. Therefore, a texture difference evaluation mechanism is added to the algorithm to reduce wrong segmentation, as described below.

For a region its strength index $RSI(R_i)$ is defined as:

$$RSI(R_i) = \frac{\sum_{C_{ij} > T_c} C_{ij}}{\sum_{C_{ji} > T_c} 1}$$

So, strength index of $R_i$ is the average of respective merging costs with its adjacent regions that are greater than $T_c$.

A threshold value $T_{rsi}$ of the region strength index is introduced. For a certain region if $RSI(R_i) > T_{rsi}$, the region is a strong region, otherwise, the region is a weak region. For $R_i$ and its adjacent region $R_j$, the texture difference thereof is recorded as $InD_{ij}$, and a threshold $T_{ind}$ is introduced. In the process of merging $R_i$ into its adjacent region, if $R_i$ is a strong region, only when $InD_{ij} \leq T_{ind}$ is also satisfied, can $R_i$ be merged to $R_j$.

Unlike $T_c$ and $T_{rsi}$, $T_{ind}$ does not need to be specified manually, but is computed automatically during a merging. Setting the initial value of the $T_{ind}$ to be 0, and updating the $T_{ind}$ in the process of merging, wherein the formula is as follows:

$$T_{ind} = \max\left(T_{ind}, \frac{\sum_{merged} InD_{ij}}{\sum_{merged} 1}\right)$$

$T_{ind}$ is updated to the greater one of itself and the mean texture difference value of all merged regions.

The texture difference $(InD_{ij})$ can be evaluated in different ways, such as the difference of the mean pixel value in the region, the difference of the median pixel value in the region, the difference of the norm of a vector composed of the mean value and standard deviation of the pixel value in the region, etc. The texture difference $(InD_{ij})$ can be calculated in different ways, and the difference of $InD_{ij}$ calculation methods do not constitute the difference with the algorithm.

Finally, the Region Merging step combining a texture difference evaluation mechanism should be as follows:
1. set $T_{ind}$ to 0;
2. sort all regions according to $MO(R_i)$ by ascending order;
3. set $C_{ind}$ and $\tau_{ind}$ to 0;
4. iterate over the sorted regions;
4.1. iterate over the adjacent region of the current region $R_i$;
4.1.1 for a region $R_j$ adjacent to the region $R_i$, if $MO(R_j) \leq MO(R_i)$ and $C_{ij} \leq T_c$;
4.1.1.1 if $RSI(R_i) > T_{rsi}$ and $InD_{ij} \leq T_{ind}$, remember the adjacent region $R_j$ that has the smallest $InD_{ij}$;
4.1.1.2 if $RSI(R_i) \leq T_{rsi}$, remember the adjacent region $R_j$ that has the smallest $InD_{ij}$;
4.2 if there exists the adjacent region $R_j$ that has the smallest $InD_{ij}$, remove the boundary between $R_i$ and its adjacent region $R_j$, add the merged region, delete the two regions that have been merged, and calculate texture difference between the merged region and its adjacent neighbors;
4.3 let $C_{ind} += 1$, $\Sigma_{ind} += InD_{ij}$, and $$T_{ind} = \max\left(T_{ind}, \frac{z_{ind}}{C_{ind}}\right);$$

5. If there were boundaries been removed, back to step 1;
6. If there were no boundaries been removed, stop.

According to the algorithm, it keeps objects' natural boundary from the boundary extraction result so that the obtained segmentation result is more accurate and the segmentation result is more stable. In addition, all regions or all categories achieve the best segmentation result on one final segmentation result. These advantages can reduce the computational resource consumption of subsequent tasks such as image mosaic, three-dimensional reconstruction, target recognition and image spot classification, and improve the processing effect.

The following are embodiments of the invention. The present invention is not limited to the following preferred embodiments, and any person skilled in the art should know the structural changes made under the inspiration of the present invention and all technical solutions having the same or similar technical solutions of the present invention fall within the scope of the present invention.

Firstly, a sobel gradient of the image to be segmented is calculated.

Secondly, a boundary is extracted by applying a Canny algorithm on the sobel gradient.

Thirdly, a Watershed algorithm runs on a sobel gradient to finish initial segmentation.

Fourthly, the adjacent topological relation of the initial segmentation result is established, Region Merging is performed according to the Region Merging mechanism with texture difference measurement that provided by this invention, and the difference of the mean pixel value in the region is used as the texture difference in the merging process.

The invention claimed is:
1. A Region Merging image segmentation algorithm based on boundary extraction, characterized in that steps of the algorithm comprise calculating a gradient image, extracting a boundary image, carrying out initial segmentation and Region Merging, wherein each pixel is regarded as one region when the initial segmentation is not conducted; and the Region Merging comprises steps of:

(1) sort all regions according to $MO(R_i)$ by ascending order;
(2) iterate over the sorted regions;
(2.1) iterate over an adjacent region of a current region $R_i$;
(2.1.1) for a certain adjacent region $R_j$ of the region $R_i$, if $MO(R_j) \leq MO(R_i)$ and $C_{ij} \leq T_c$, remember the $R_j$ that has smallest $MO(R_j)$;
(2.2) if there exists the adjacent region $R_j$ that has smallest $MO(R_j)$, remove the boundary between $R_i$ and the adjacent region $R_j$, add a merged region and delete two regions that have been merged;
(3) if there being boundaries been removed, back to step 1;
(4) if there being no boundary been removed, stop;

wherein $MO(R_i)$ and $MO(R_j)$ are merging orders for regions $R_i$ and $R_j$, respectively, that are based on average gradient values; $C_{ij}$ is a merging cost for merging regions $R_i$ and $R_j$ that is based on the length of a portion of their common boundary; and $T_c$ is a threshold value.

2. The Region Merging image segmentation algorithm based on boundary extraction according to claim 1, further comprising a texture difference evaluation mechanism which, when added to the Region Merging set in claim 1, results in an Augmented Region Merging as follows:

(1) set $T_{ind}$ to 0;
(2) sort all regions according to $MO(R_i)$ by ascending order;
(3) set $C_{ind}$ and $\Sigma_{ind}$ to 0;
(4) iterate over the sorted regions;
(4.1) iterate over an adjacent region of the current region $R_i$;
(4.1.1) for a region $R_j$ adjacent to the region $R_i$, if $MO(R_j) \leq MO(R_i)$ and $C_{ij} \leq T_c$;
(4.1.1.1) if $RSI(R_i) > T_{rsi}$ and $InD_{ij} \leq T_{ind}$, remember the adjacent region $R_j$ that has the smallest $InD_{ij}$;
(4.1.1.2) if $RSI(R_i) \leq T_{rsi}$, remember the adjacent region $R_j$ that has the smallest $InD_{ij}$;
(4.2) if there exists the adjacent region $R_j$ that has the smallest $InD_{ij}$, remove the boundary between $R_i$ and its adjacent region $R_j$, add the merged region, delete the two regions that have been merged, and calculate texture difference between the merged region and its adjacent neighbors;
(4.3) let $C_{ind}=1$, $\Sigma_{ind}+=InD_{ij}$, and $$T_{ind} = \max\left(T_{ind}, \frac{z_{ind}}{C_{ind}}\right);$$

(5) If there were boundaries been removed, back to step 2;
(6) If there were no boundaries been removed, stop;

wherein $RSI(R_i)$ is a strength index of region $R_i$ that is the average of merging costs $C_{ij}$ of its adjacent regions $R_j$ with $C_{ij}$ greater than $T_c$; $T_{rsi}$ is a second threshold value; and $I_nD_{ij}$ is a texture difference between region $R_i$ and region $R_j$.

* * * * *